(12) United States Patent
Mathur et al.

(10) Patent No.: US 10,878,328 B2
(45) Date of Patent: Dec. 29, 2020

(54) METHOD AND SYSTEM FOR ANALYZING DRIVER BEHAVIOUR BASED ON TELEMATICS DATA

(71) Applicant: TATA CONSULTANCY SERVICES LIMITED, Mumbai (IN)

(72) Inventors: Raghav Mathur, Bangalore (IN); Rajesh Kavadiki, Bangalore (IN); Balaram Panda, Bangalore (IN); Sumit Kumar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 771 days.

(21) Appl. No.: 15/418,927

(22) Filed: Jan. 30, 2017

(65) Prior Publication Data

US 2017/0364821 A1 Dec. 21, 2017

(30) Foreign Application Priority Data

Jun. 21, 2016 (IN) .............................. 201621021327

(51) Int. Cl.
| | | |
|---|---|---|
| *G06N 7/00* | (2006.01) | |
| *G06N 20/20* | (2019.01) | |
| *G06N 5/00* | (2006.01) | |
| *G06N 20/00* | (2019.01) | |
| *G01C 21/34* | (2006.01) | |
| *G01C 21/36* | (2006.01) | |
| *G08G 1/01* | (2006.01) | |
| *G01C 21/26* | (2006.01) | |

(52) U.S. Cl.
CPC ............. *G06N 7/005* (2013.01); *G01C 21/26* (2013.01); *G01C 21/3484* (2013.01); *G01C 21/3617* (2013.01); *G06N 5/003* (2013.01); *G06N 20/00* (2019.01); *G06N 20/20* (2019.01); *G08G 1/0112* (2013.01); *G08G 1/0129* (2013.01)

(58) Field of Classification Search
CPC ........ G06N 20/00; G06N 20/10; G06N 20/20; G06N 7/005; G06N 5/003
USPC .......................................................... 706/12
See application file for complete search history.

(56) References Cited

U.S. PATENT DOCUMENTS

| | | |
|---|---|---|
| 6,449,572 B1 | 9/2002 | Kurz et al. |
| 7,197,394 B2 | 3/2007 | Ohler |
| 8,332,242 B1 * | 12/2012 | Medina, III ........... G06Q 40/08 705/35 |

(Continued)

*Primary Examiner* — Lut Wong
(74) *Attorney, Agent, or Firm* — Finnegan, Henderson, Farabow, Garrett & Dunner, LLP

(57) ABSTRACT

System and method for analyzing driver behavior based on telematics data are disclosed. In an example, a probability of a user driving a vehicle is computed and a risk score is generated to develop at least one driver profile based on the probability. Further, routes taken by said user driving said vehicle are clustered to generate enhanced driver profile and using the clustered output to develop dynamic intelligent contexts for each said route and adding contextual intelligence messages to customize said risk score. Furthermore, the routes taken by the said user in real time are predicted. In addition, a missing route is identified through imputation of missed routes to compute annualized mileage, and a missing distance is imputed in an analysis of at least one trip of the driver in the vehicle. Also, independent trips are stitched based on at least one recommendation from an analytics engine.

15 Claims, 6 Drawing Sheets

(56) References Cited

U.S. PATENT DOCUMENTS

| | | | |
|---|---|---|---|
| 2005/0125148 A1* | 6/2005 | Van Buer | G01C 21/3617 |
| | | | 701/468 |
| 2007/0010933 A1* | 1/2007 | Hochkirchen | B60W 10/26 |
| | | | 701/117 |
| 2008/0125959 A1 | 5/2008 | Doherty et al. | |
| 2017/0032480 A1* | 2/2017 | Wong | G06Q 50/14 |
| 2017/0294139 A1* | 10/2017 | Cordova | G09B 7/06 |
| 2017/0309092 A1* | 10/2017 | Rosenbaum | G01M 17/007 |
| 2019/0215660 A1* | 7/2019 | Slushtz | H04W 4/024 |

* cited by examiner

- ● INDICATES THE TRIP PATTERNS TAKEN BY DRIVER HIMSELF
- ● INDICATES THE TRIP THAT ARE NOT TAKEN BY THE DRIVER, BUT HE WAS A PASSENGER IN AN OTHER VEHICLE
- ● INDICATES THE TRIP THAT ARE ADDED TO THE MODEL TO FIND THE DRIVERS DRIVING PATTERNS
- ◌ MODEL BOUNDARY, ANYTHING WITHIN THE BOUNDARY WOULD BE MARKED AS "1" AND OUTSIDE WOULD BE MARKED AS "0"

METHOD AND SYSTEM FOR ANALYZING DRIVER BEHAVIOUR BASED ON TELEMATICS DATA

PRIORITY CLAIM

This U.S. patent application claims priority under 35 U.S.C. § 119 to India Application No. 201621021327, filed on Jun. 21, 2016. The entire contents of the aforementioned application are incorporated herein by reference.

TECHNICAL FIELD

The present application relates to the field of telematics and more particularly to implementation of analysis techniques for driver behavior and related features based on aggregated telematics data.

BACKGROUND

Telematics generally relates to usage implementation of multiple wireless devices and relevant technologies to primarily transmit data dynamically. With advancement of telematics technology, various communication methodologies have been incorporated into automobiles and other types of vehicles. Typically, vehicle telematics involves vehicle tracking, trailer tracking, fleet management, satellite navigation and so on.

The subject area of vehicle tracking implemented with the understanding of telematics involves monitoring locations, movements, driver status, and behavior of a vehicle/driver or fleet of vehicles. This analysis is obtained through a working combination of multiple interconnected devices such as a global positioning system (GPS) receiver and an electronic device (usually comprising a GSM/GPRS modem or SMS sender) installed in each vehicle that is communicating with the user (dispatching, emergency or coordinating unit) and personal computer based or web-based software. Telematics data can be generated by mobile applications, sensors installed on the vehicles, on-board diagnostics (OBD) devices and so on.

The telematics data is usually converted into contextual information by usage of machine learning techniques in aggregation with a visual display on a computerized mapping software. Existing and conventional data analytic methodologies developed for telematics address a certain set of issues related to data aggregation of driver behavior. Although the conventional data analytics techniques are able to analyze and pin point specific issues to some extent, they are limited in nature with respect to feasibility and these techniques are not able to provide detailed and relevant insights with contextual aggregation on driver behavior details in a comprehensive manner.

Currently, telematics data is utilized to analyze driver behavior, identify a potentially high-risk or unsafe driving behavior, generate driver profile scores, analyze driver performance, various aspects of vehicle performance, such as vehicle travel delays and vehicle speeds. There are several other features of driving behavior beyond a limited driver profile wherein some of these features based on analytic techniques can actually create much more accurate predictions about how safe the driver is driving the vehicle, whether the driver himself is driving or not so on and so forth.

SUMMARY

Embodiments of the present disclosure present technological improvements as solutions to one or more of the above-mentioned technical problems recognized by the inventors in conventional systems. In view of the foregoing, embodiments herein provide a system and method for analyzing driver behavior by aggregating telematics data.

In view of the foregoing, an embodiment herein provides method and system for analyzing driver behavior by aggregating telematics data. In one embodiment, a computer-implemented method for analyzing driver behavior by aggregating telematics data is provided. The method includes computing a probability of a user driving a vehicle and generating a risk score to develop at least one driver profile based on the computed probability. Further, the method includes clustering a plurality of routes taken by the user driving the vehicle to generate enhanced driver profile. The clustered output is used to develop a plurality of dynamic intelligent contexts for each the route and adding a plurality of contextual intelligence messages to customize the risk score wherein the driver profiling is enabled and associated with a plurality of trip level data for the driver. Furthermore, the method includes predicting the plurality of routes taken by the user in real time. Predicting includes a prediction of a type of trip based on at least one of a historical and a real time geo co-ordinate data. Moreover, the method includes identifying a missing route through imputation of a plurality of missed routes to compute annualized mileage, and imputing a missing distance in an analysis of at least one trip of the driver in the vehicle. Further, the method includes stitching of a plurality of independent trips based on at least one recommendation from an analytics engine.

In another embodiment, a computer-implemented system for analyzing driver behavior by aggregating telematics data is provided. The at least one memory is coupled to the at least one processor and the at least one processor is capable of executing programmed instructions stored in the at least one memory to compute a probability of a user driving a vehicle and generate a risk score to develop at least one driver profile based on the computed probability. Further, the at least one processor is capable of executing programmed instructions to cluster a plurality of routes taken by the user driving the vehicle to generate enhanced driver profile and use the clustered output to develop a plurality of dynamic intelligent contexts for each the route and add a plurality of contextual intelligence messages to customize the risk score, wherein the driver profiling is enabled and associated with a plurality of trip level data for the driver. Furthermore, the at least one processor is capable of executing programmed instructions to predict the plurality of routes taken by the user in real time. Predicting includes a prediction of a type of trip based on at least one of a historical and a real time geo co-ordinate data. Moreover, the at least one processor is capable of executing programmed instructions to identify a missing route through imputation of a plurality of missed routes to compute annualized mileage, and impute a missing distance in an analysis of at least one trip of the driver in the vehicle. Further, the at least one processor is capable of executing programmed instructions to stitch a plurality of independent trips based on at least one recommendation from an analytics engine.

In yet another embodiment, a non-transitory computer-readable medium having embodied thereon a computer program for executing a method for analyzing driver behavior by aggregating telematics data. The method includes computing a probability of a user driving a vehicle and generating a risk score to develop at least one driver profile based on the computed probability. Further, the method includes clustering a plurality of routes taken by the user driving the vehicle to generate enhanced driver profile. The clustered output is used to develop a plurality of dynamic intelligent contexts for each the route and adding a plurality of contextual intelligence messages to customize the risk score wherein the driver profiling is enabled and associated with a plurality of trip level data for the driver. Furthermore, the method includes predicting the plurality of routes taken by the user in real time. Predicting includes a prediction of a type of trip based on at least one of a historical and a real time geo co-ordinate data. Moreover, the method includes identifying a missing route through imputation of a plurality of missed routes to compute annualized mileage, and imputing a missing distance in an analysis of at least one trip of the driver in the vehicle. Further, the method includes stitching of a plurality of independent trips based on at least one recommendation from an analytics engine.

It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this disclosure, illustrate exemplary embodiments and, together with the description, serve to explain the disclosed principles.

DETAILED DESCRIPTION

Figure 1:
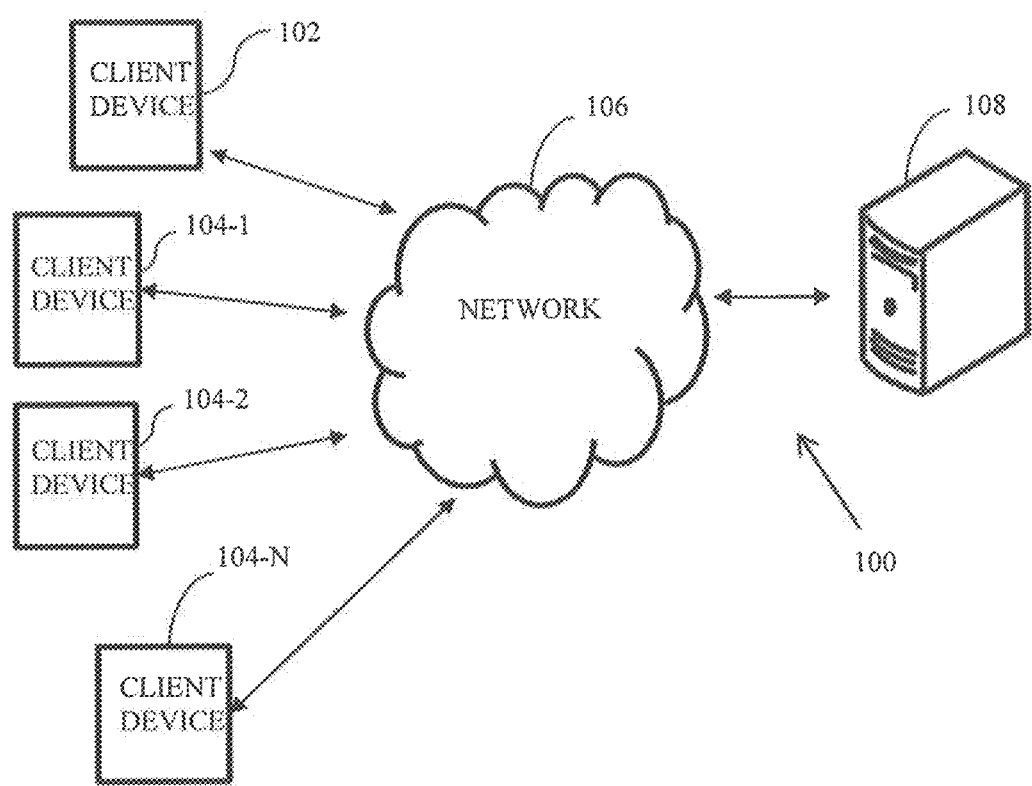
FIG. 1 illustrates an exemplary block diagram depicting a telematics data based system for analyzing driver behavior, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

According to various embodiments of the present application, a method and a system for analyzing driver behavior using telematics data is described. In an example, the telematics based data is generated by a installing a plurality of mobile applications via at least one sensor installed on the mobile device, and other related devices mounted on the vehicle. Further, based on the consolidation of the telematics data gathered from various sources an analytics platform in the system quantifies the riskiness factor of each driver in a manner of driving the vehicle. This quantification is implemented in analyzing these risk scores which are attributed to each driver at a particular trip level and a driver level. In an aspect the trip level can be either at a start location and at an end (destination) location of the trip and the driver level is related to the driver who is driving the particular vehicle. The risk scores are further aggregated at the daily, weekly and monthly levels and can then be customized at any required level.

Additionally, the analytics platform is also capable of estimating the home and parking location of the drivers respectively which is obtained by using at least geo location data of the trip of the driver. Once the risky scores are quantified and the estimation of home and parking location of the drivers are obtained, then the analytics platform estimates the number of missing trips and missed miles made by the driver. This estimation is performed using the time of the last end trip and the first start trip along with the geo coordinates for each of the prior and posterior trips. Additionally, the analytics platform identifies trips which were similar and taken on the same/similar route by the driver using route matching methods. Moreover, the analytics platform identifies if the driver himself is driving the vehicle versus another driver driving the vehicle using driving patterns created by the driver. Additionally, the analytics platform based on the historical and real time geo coordinate data predict the trip type such as whether the trip taken by the driver is a personal trip or a trip to his work place. Further, the analytics platform enables stitching two independent trips together which is performed by checking if the two trips were actually broken recordings of one continuous trip. Furthermore, the analytics platform comprises one or more of social and competitive components that include the potential to change user behavior in the way the driver drives a vehicle.

FIG. 1 illustrates an exemplary network environment 100 including a system 108 for generating analytic insights from a telematics data, according to some embodiments of the present disclosure. Although the present disclosure is explained in the manner considering that the system 108 is implemented on a server, it is appreciated that the system 108 may also be implemented in a variety of computing systems, such as a laptop computer, a desktop computer, a notebook, a workstation, a mainframe computer, a server, a network server, a portable electronic device and the like. In one embodiment, the system 108 may be implemented in a cloud-based environment. It is also appreciated that the system 108 may be accessed by multiple users through one or more client devices 104-1, 104-2, . . . 104-N, collectively referred to as client devices 104 hereinafter, or applications residing on the client devices 104. Examples of the client devices 104 may include, but are not limited to, a portable computer, a personal digital assistant, a handheld device, and a workstation. The user devices 104 may be communicatively coupled to the system 108 through a network 106.

In one embodiment, the network 106 may be a wireless network, a wired network, or a combination thereof. The network 106 may be implemented as one of the different types of networks, such as intranet, local area network (LAN), wide area network (WAN), the internet, etc. The network 106 may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network 106 may include a variety of network devices, including routers, bridges, servers, computing devices, storage devices, and the like.

Figure 2:
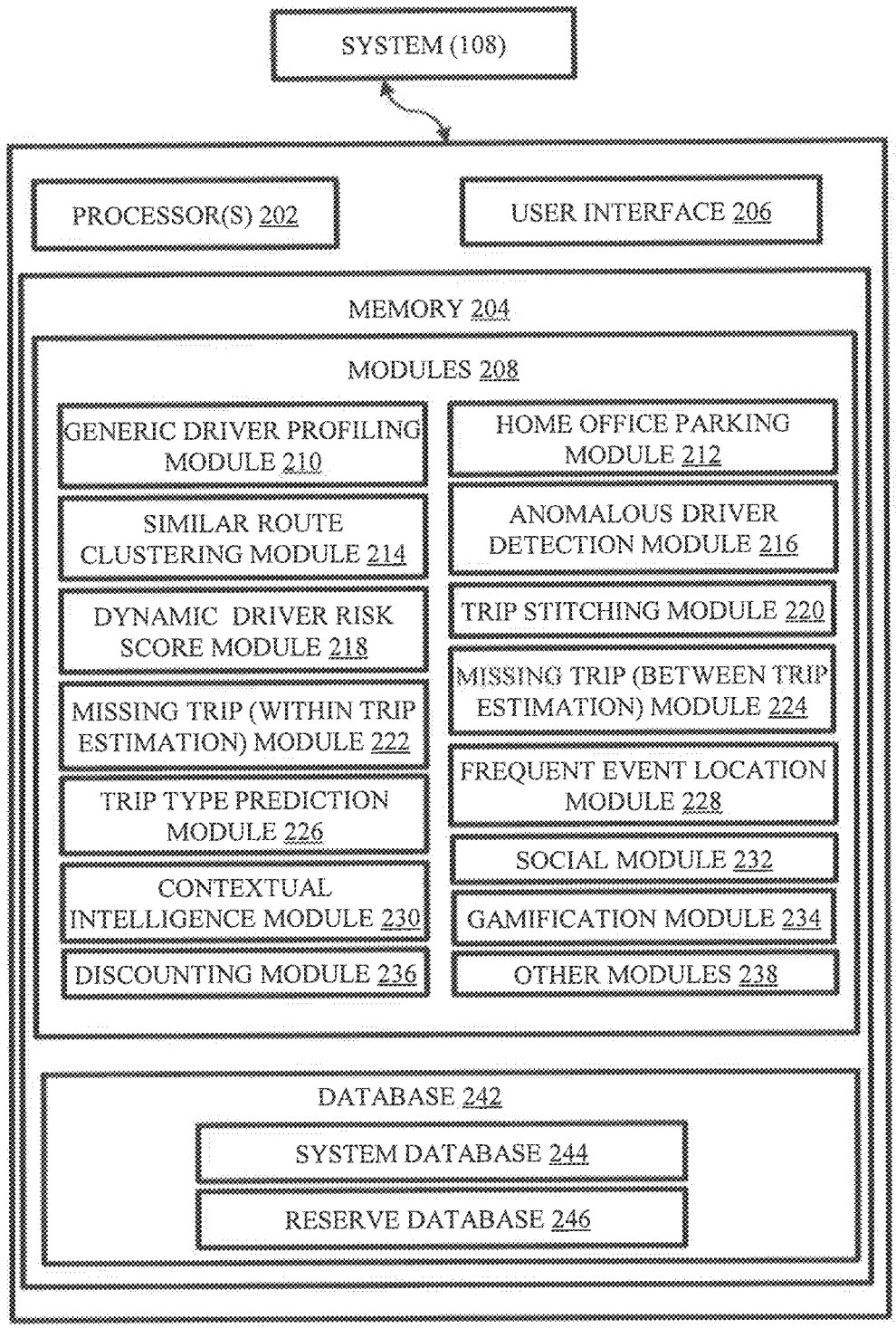
FIG. 2 illustrates an exemplary block diagram of system for analyzing driver behavior based on telematics data, according to some embodiments of the present disclosure.

FIG. 2 illustrates a block diagram of a system 108 for generating a plurality of analytic insights from telematics data, according to some embodiments of the present disclosure. As shown in FIG. 2, the system 108 includes one or more processor(s) 202 and a memory 204 communicatively coupled to each other. The processor 202 can be implemented as one or more microprocessors, microcomputers, microcontrollers, digital signal processors, central processing units, state machines, logic circuitries, and/or any devices that manipulate signals based on operational instructions. Among other capabilities, the processor 202 can be configured to fetch and execute computer-readable instructions stored in the memory 204.

The user interface 206 may include a variety of software and hardware interfaces, for example, a web interface, a graphical user interface, etc. The user interface 206 can allow the system 108 to interact with a user directly or through the user devices 104. Further, the user interface 206 may enable the system 108 to communicate with other computing devices, such as web servers and external data servers (not shown). The user interface 204 can facilitate multiple communications within a wide variety of networks and protocol types, including wired networks (e.g. LAN, cable networks, etc.) and wireless networks (e.g., WLAN, cellular networks, or satellite networks). The user interface 206 can include one or more ports for connecting a number of devices to one another or to another server.

The memory 204 may include any non-transitory computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 may include modules 208 and database 242.

The modules 208 may include routines, programs, objects, components, data structures, etc., which perform particular tasks, functions or implement particular abstract data types. In one embodiment, the modules 208 may include a generic driver profiling module 210, a home office parking module 212, a similar route clustering module 214, an anomalous driver detection module 216, a dynamic driver risk score module 218, a trip stitching module 220, a missing trip (within trip estimation) module 222, a missing trip (between trip estimation) module 224, a trip type prediction module 226, a frequent event location module 228, a contextual intelligence module 230, a social module 232, a gamification module 234, a discounting module 236, and other modules 238. The other modules 238 can include programs or coded instructions that supplement applications and functions of the system 108.

The database 242, among other things, serves as a repository for storing data processed, received, and generated by one or more of the modules 208. The database 242 can also include a system database 244, and a reserve database 246. The reserve database 246 can include data generated as a result of the execution of one or more modules in the other module 238.

In an aspect the generic driver profiling module 210 is configured to compute the driver profile that is based on the summary statistics generated on top of trip level data for each driver. Driver profiling depends on statistics such as standard deviation of the acceleration patterns of the driver, kurtosis (the peakedness of the distribution) of the trip speed and so on. Such driver profiling facilitates building and developing driver segmentations that is based on features desirable at a given point in time. For example, driver profiling allows segmentation of the drivers who drive fast versus those drivers who drive slow. Segmentation of drivers is based on consistency of their driving behavior.

In another aspect, the home office parking module 212 is configured for computing geographical approximations that is used for accurate assessment of the risk associated to the vehicle based on the geographical location in which the vehicle operates. Herein, parking locations are also considered useful to generate contextual intelligence based user engagement features in the mobile application. A parking location identification model is used to find the certain preferred parking locations also referred to as top 'k' parking locations used by a driver with the risks associated with that particular parking area. The parking method used herein considers trips completed by a driver for example (last 15 driving days) as input and the output obtained is a preferential list of top 'k' parking locations and the number of times the driver entered and left the parking area with respect to different time slots.

Consider that twenty four hours' time period is grouped into six time slots as indicated in the following table. Throughout the specification, parking area/location is referred by node id.

| Time Slot Index | Time Slot   | [Start hour (or End hour)/4] |
|-----------------|-------------|------------------------------|
| T1              | 00:00-03:59 | 0                            |
| T2              | 04:00-07:59 | 1                            |
| T3              | 08:00-11:59 | 2                            |
| T4              | 12:00-15:59 | 3                            |
| T5              | 16:00-19:59 | 4                            |
| T6              | 20:00-23:59 | 5                            |

A set of node lists and edge lists are created and initially they are empty. A node list is the list of all the trip start and trip end coordinates where the drivers starts or end the trip. Edge list is the list of all pairwise points from where a driver begins the trip and ends it. Edge list is the list of all such pairwise relationships between all points in the node list. The steps to set values to node list and edge list are as follows:

Step 1:—The first trip should be read first. The start location and end location of the trip to the node list are then added. Consider start location as start node and end location as end node.

Step 2:—If there are still unread trips, the next trip should be read. It is necessary to check whether there is any nearest node in node list to the start location of the trip within one kilo meter radius.

Step 3:—If step 2 is considered as yes, then the nearest node to start location is considered as the start node. If the step 2 is considered as no, then start node is the start location itself and the start location should be added to the node list Step 4:—Any nearest node in a node list to the end location of the trip within a one kilo meter radius is determined.

Step 5:—If step 4 is considered as yes, then the nearest node to end location is considered as end node. If step 4 is considered no, then end node is the end location itself and the end location should be added to the node list.

Step 6:—The edge (start node, end node) is added to the edge list.

The steps from step 2 to step 6 is carried out for all the trips consecutively. This would result in the output where in node list comprises of the parking locations used by the driver and edge list comprises of trips undergone by the driver.

The trips taken by a driver is represented in a directed pseudo graph (A graph where edges between the nodes carry a direction it could be a unidirectional or bidirectional) drawn using the nodes and edges. In a directed pseudo graph, indegree is the number of edges directed towards a node and outdegree is the number of edges directed outside of a node. Indegree and outdegree at each node is the number of times the driver entered and left that node. A node with maximum indegree or outdegree is considered the most used parking location by the driver.

To determine the count of entry/exit in parking location at each time slot, the lists of both indegree and outdegree at each node are computed and the results are sorted in descending order so that the top k values from each indegree and outdegree lists are the top k most used nodes. Indegree and outdegree lists are stored in two separate lists. Six bins are created to represent each time slots and each bin is initialized by zero. To find the count of entry into a node at each time slot, all edges that are directed into the node are collected. By dividing the end hour of each edge by four, time slot index is found and corresponding time slot bin is incremented by one. To find the count of exit from a node at each time slot, all the edges that is directed out from the node are collected. By dividing the start hour of each edge by four, the time slot index is found and corresponding time slot bin is incremented by one.

Figure 3:
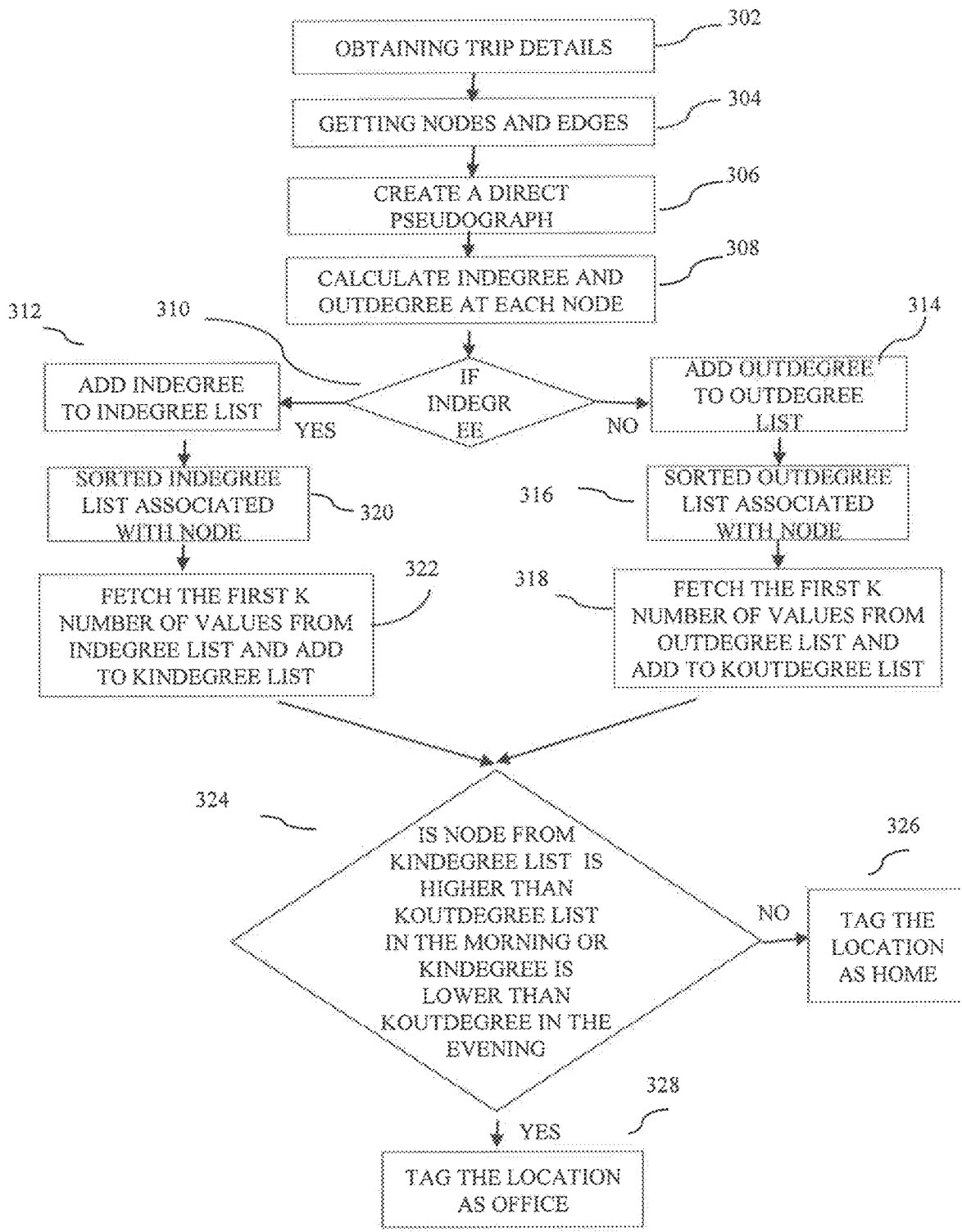
FIG. 3 is an exemplary flow chart diagram illustrating a process for identifying the parking location used by a driver, according to some embodiments of the present disclosure.

FIG. 3 is a flow diagram illustrating process of parking location identification which is performed by home office parking module 212, according to some embodiments of the present disclosure.

In step 302, the trip details containing start location and end location of the trip are recorded.

In step 304, certain nodes and edges are set. The nodes are the parking areas/locations. For each trip, the start location of the trip is added as start node and end location of the trip is added as end node to the node list. The edge list is set by adding (start node, end node) of each trip. The node list includes the parking location used by the driver and edge list considers the trips done by the driver.

In step 306, in order to represent all trips taken by a driver, a directed pseudo graph is constructed by using the nodes and edges. A directed pseudo graph is a non-simple directed graph in which both graph loops and multiple edges are permitted.

In step 308, an indegree and outdegree at each node is calculated by drawing a directed pseudo graph. A directed pseudo graph is a collection of Nodes and collection of edges that connect a pair of nodes. In any typical graph, the nodes are denoted by ovals and edges are denoted as lines that connect the nodes. Indegree is the number of edges directed into a node and outdegree is the number of edges directed out of a node.

In step 310, a determination is made as to whether the node is associated with a indegree or outdegree. In step 312, a node is added to the indegree list if the node is associated with a indegree and in step 314 node is added to the outdegree list, if node is associated with the outdegree.

In step 316, the outdegree list associated with the node is sorted in the descending order. In step 318, top k values of outdegree at each node is fetched and added to the koutdegree list.

In step 320, the indegree list associated with the node is sorted in descending order. In step 322, top k values of indegree at each node is fetched and added to the kindegree list.

In step 324, a determination is made to see whether the kindegree node list and koutdegree node list are equal. If the kindegree and koutdegree node lists are equal then the node lists are collected in six bins representing different time slots such as (00:00-03:59, 04:00-07:59, 08:00-11:59, 12:00-15:59, 16:00-19:59, 20:00-23:59). Each bin is initialized by zero. All edges that are directed into the node are collected to count the entry in a node at each time slot. By dividing the end hour of each edge by four, the time slot index is assessed and the corresponding time slot bin is incremented by one. All edges that are directed out from the node are collected to the count of exit from a node at each time slot. By dividing the start hour of each edge by four, a time slot index is found and a corresponding time slot bin is incremented by one. In step 326, if kindegree is lesser than koutdegree in the morning hours and higher in the evening hours then it is considered as a home location. In step 328, if kindegree is greater than koutdegree in the morning bins and lesser in the evening bins it is considered as office location.

In yet another aspect, the similar route clustering module 214 is configured to identify which trips were similar and taken on the same route. The route clustering method is a machine learning technique which works on the basis of customized algorithms for identifying similar routes. This technique improves upon the Ramer-Douglas-Peucker (RDP), a technique for reducing the number of points in a curve that is approximated by a series of points. This technique is used for a two dimensional route clustering. The route matching technique takes a route that is more than 1.25 miles long as input and prints all the routes that are similar to that route with a similarity measure as output. It has two parts and the first part is known as 'Angle Binning' and second part is 'Finding Matches'. In angle binning, all the trips (irrespective of the driver id) are allocated to a bin depending on the destination direction from origin. Thus, all the routes are categorized into thirty six different buckets wherein each bucket has a range of ten degrees.

In finding matches, the bucket number of the input route is found and the input route is compared with all the path in the specific, preceding and succeeding bucket, as the similar route must be more or less in the same direction as of the input route. A RDP technique is used to decrease the number of points which represents the route without losing route level information about the curves. RDP technique breaks the given path into one or more vectors and compares vectors between two paths with a rolling window method. If the angle between the vectors is within the threshold and number of vector matches is greater than the threshold percentage then the routes are considered to be similar.

The detailed method for similar route clustering is described below:

Step 1—Angle Binning:
a. Conversion of latitude and longitude to a meter scale:
Herein, each route is represented by a sequence of points where each point is a pair of latitude and longitude. Latitude and Longitude data are converted into a meter scale and so the trips would be starting from origin (0, 0). The last location of the trip in the format (Latitude, Longitude) is converted to meter scale by taking haversine distance between start location and (last location's latitude, start location's longitudes) as x position and haversine distance between start location and (start location's latitude, last location's longitudes) as y position. The haversine formula is an equation important in navigation, giving great-circle distances between two points on a sphere from their longitudes and latitudes. It is a special case of a more general formula in spherical trigonometry, the law of haversines, relating to the sides and angles of spherical "triangles".

b. Getting angle of trip:
In order to find the destination direction of the trip, the angle between from x axis and the line joining origin to the last position is determined by:

Angle of Trip=$a$ tan(last position's $y$ co-ordinate/last position's $x$ co-ordinate).

c. Including trips to its bucket:
Any trip that is in the range of 10 degrees is included into the same bucket, selecting the threshold for binning is a tradeoff between accuracy and de-noising. The more the threshold, the lesser accurate are the bins and better de-noised the data is. As the circle is from 0 to 360, one could obtain 36 buckets numbered from 0 to 35. The bucket number is determined as angle of trip/10.

Step 2—Finding Matches:
d. Finding Input Route's Bucket Number: This is similar to step a,b,c as detailed in step 1.
e. Collecting the trips in the Direction of Input Route: This is implemented by taking all the trips from the input route's bucket number and also the preceding and succeeding bucket number.
f. Setting a path for each trip
Path has the following attributes:
1. Driver id
2. Trip id
3. Meter scale points—Meter scale points is the list of xy position of each location in the trip which is in (latitude, longitude) format. This conversion of latitude and longitude to a meter scale can be performed by the logic used in angle binning.
4. Distance:
5. Time—Time is the number of points in the route list.
6. RDP points—It is the list of filtered points from the meter scale points. Filtering is done by the RDP technique. Filtered points are used while comparing at least two routes
   i. The purpose of the technique is given a curve/trip composed of line segments, to find a similar curve with fewer points. The technique defines 'dissimilar' based on the maximum distance between the original curve and the simplified curve. The simplified curve comprises of a subset of the points that defines the original curve.
   ii. The starting curve is an ordered set of points or lines and the distance dimension or RDP tolerance c>0.
   iii. The technique recursively divides the line. Initially, it is given the points between the first and last point. It automatically marks the first and last point to be retained. The technique then finds the point that is furthest from the line segment with the first and last points as end points (this point is furthest on the curve from the approximating line segment between the end points).
   iv. If the point is closer than c to the line segment then any points not currently marked to be retained is discarded without the simplified curve being worse than e.
   v. If the point furthest from the line segment is greater than c from the approximation then that point must be retained.
   vi. The algorithm recursively calls itself with the first point and the worst point and then with the worst point and the last point (which includes marking the worst point being marked as retained).

When the recursion is completed a new output curve is generated consisting of all (and only) those points that have been marked as retained.

In yet another aspect, the anomalous driver detection module 216 is configured to distinguish between the trip that is taken by the driver himself or the driver as a passenger in another vehicle. The driver detection is carried out using driving patterns such as average speed, average acceleration, average deceleration, braking patterns, acceleration patterns, max speed, and speed during turning and so on which are derived from the latitude longitude information captured by the telematics device.

Figure 4:
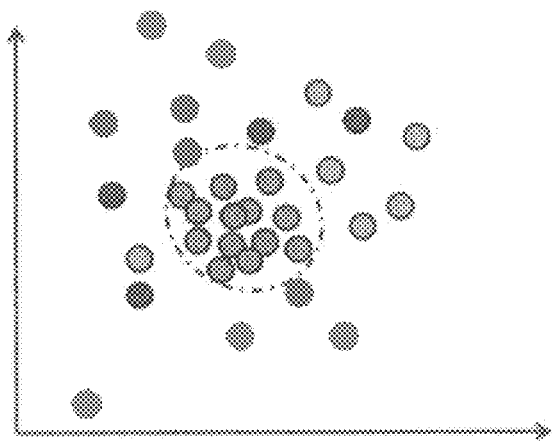
FIG. 4 illustrates an exemplary driving pattern of the driver using a random forest technique, according to some embodiments of the present disclosure.

As the driver may not indicate whether the trips are taken by them, assumption is made out of all the trips recorded by the telematics device majority of the trips are taken by the driver himself and a minority of them are not driven by the driver himself. A semi supervised model is built by marking all of the trips that the telematics device has recorded for a user irrespective of the case that driver has driven them himself or not and mark them as "1" (indicative of the trips taken by the driver himself) and randomly chose trips from other random drivers and mark them as "0" (indicative of the trips that are not driven by the user). As most of trips are driven by the driver, there can be a dense cluster of observations in a smaller area and the other observations that are randomly picked from other drivers would be far apart including the one's in which the given driver was a passenger. A random forest technique is used to distinguish a nonlinear boundary between driving patterns of the drivers. Random forest is a machine learning model which is able to distinguish between observations with target=1 versus target=0 based on the trip level features which was created earlier. Trip level features take the geo-location data and build variables like average speed, maximum speed, standard deviation of speed, acceleration and so on. These trip level features, along with target=1 or target=0 are fed to the random forest machine learning model. The model learns the driver signature which is the dominant way in which a driver drives the vehicle. The driver signature is a complex mathematical equation which has the capability to be used in future as well to identify trips as being driven by the driver or not. Random forest technique uses an ensemble to weak decision trees to build a strong decision tree for the purpose of classification in analytics. FIG. 4 illustrates an exemplary driving pattern of the driver using random forest technique.

Configuration Parameters

| Parameter | Value |
| --- | --- |
| Trees | 400 |
| max_features | 24 |

Figure 5:
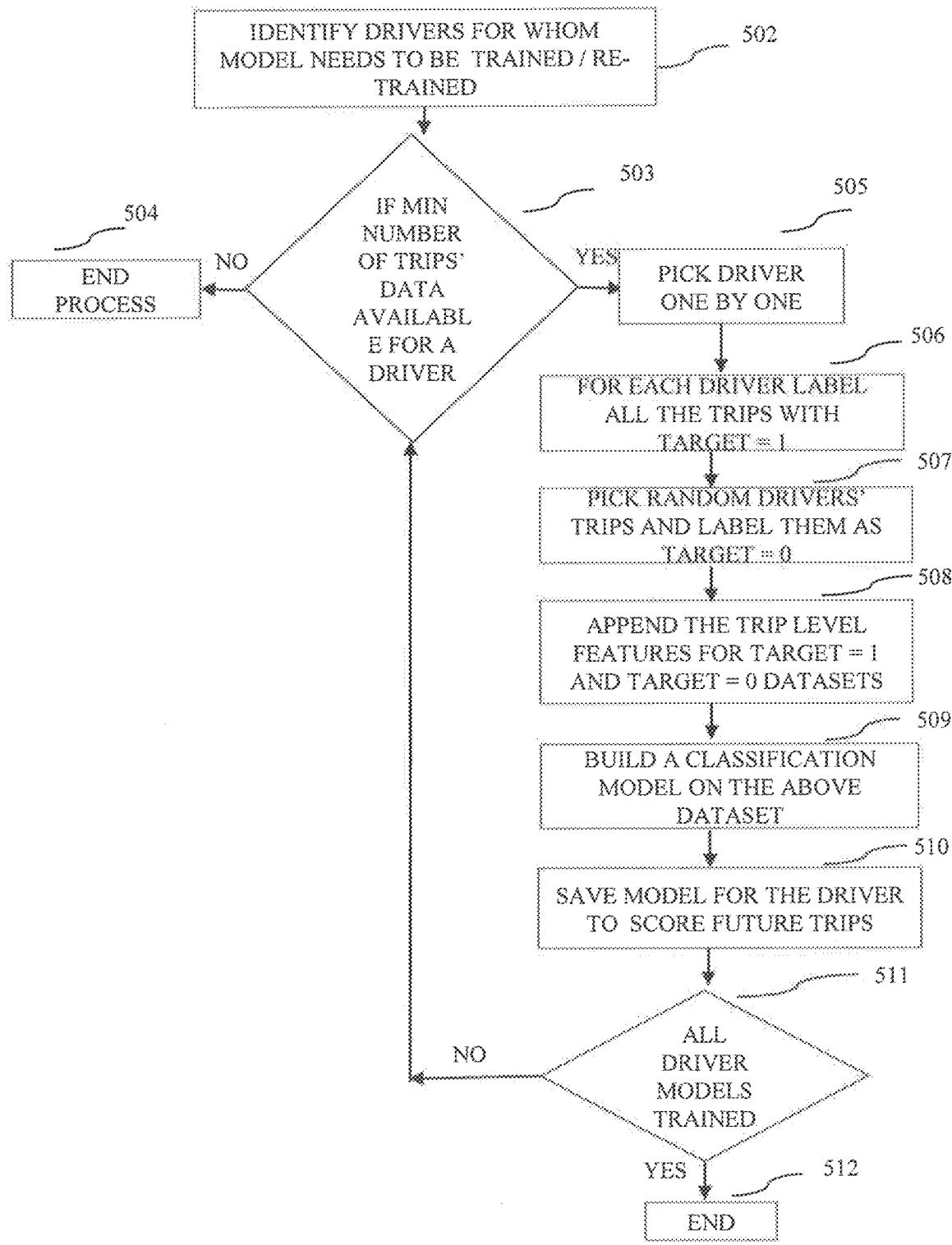
FIG. 5 is an exemplary flow chart diagram illustrating a process to build a classification model using the driving patterns of the driver, according to some embodiments of the present disclosure.

FIG. 5 is a flow chart of a process to build a classification model using the driving patterns of the driver, according to some embodiments of the present disclosure. Firstly, the drivers for whom the driver signature model is to be developed are identified at step 502. If each of those drivers have a minimum number of trips worth of data available, only then the driver identification model can be trained at step 503. The minimum number of trips required to train such a model for a driver are around the range of 100 trips. At times the same identification model can be trained with around the range of 50 trips data as well, given enough data from other drivers and all 50 trips driven by this same driver. In case, there is not enough trip data for a given driver then the process ends for that driver. For each driver, the trips driven by the driver are marked as target=1, at step 506 and then random drivers' trips' are chosen from the remaining data and such random trips are marked as target=0 at step 507. Next, both the datasets for target=1 and target=0 are appended and the trip level features are computed on this dataset at step 508. Further, a classification model is trained on this dataset (such as a random forest model) at step 509. Once the model has been trained, the model is saved for future use to score incremental trips at step 510. The process ends at step 512 once all drivers' classification models are trained (or re-trained as the case might be)

In yet another aspect, the dynamic driver risk score module 218 is configured for computing the risk scores of an individual driver at the trip level, driver level and also aggregated risk scores at the day, week and month levels. The risk scores indicate how risky the driver is in his driving patterns. The risk scores are calculated using machine learning models which leverage complex driving patterns such as standard deviation of speed, percentage time on freeways, idle time ratios and so on. These models predict the probability of a driver to cause a risky event such as hard braking, hard acceleration, hard cornering and other related techniques.

In yet another aspect, the trip stitching module 220 is configured to stitch two independent trips together as one trip based on the recommendation from the underlying analytic engine which decides whether the two trips were actually broken recordings of one continuous trip. Trip stitching is a technique that refers to joining two consecutive trips and then considering them as one single trip if the distance between the end of the previous trip and start of the next trip is less than 1 mile or time difference is less than 5 minutes. During a travel of two trips, if the latitude-longitude are lying close to each other on the distance or time scale, then perhaps this indicates that they are the considered to be part of the same trips just that the signal broke in between the two trips. The techniques used in the present application are used to implement stitching of such trips and consider them as a single trip. This stitching is done via appending the two trips' GPS trail one after the other to make them into one trip. This is considered important in estimating the mileage and risk scores from a given trip which facilitates accurate risk profiling.

In yet another aspect, missing trip estimation (component within a trip) module 222 is configured for computing the missing trip estimation due to loss of signal because of which a part of the trip is not recorded properly. Using a linear interpolation method to impute the missing value, for example speed, in the trip data Interpolated speed=old_speed+(new_speed−old_speed)/time_diff*$n$, Where n is the count of missing data points being added and rest of the values remains unchanged.

In yet another aspect, the missing trip estimation (component between trips) module 224 is configured to compute estimate of entire trip which leads to computation of the accurate annualized mileage The logic of the imputation is as follows: If the distance between end geo location and the start geo location of two consecutive trips are greater than 5 miles then from the drivers historical data a trip would be searched which matches trip 1 end geo location and trip 2 start geo location with a buffer distance of 1.25 miles. Thus a new trip is constructed from the historical data and would be inserted trip between trip1 and trip2. If there is more than one match found then the best trip is selected depending on the nearest cumulative distance between the difference between origin and destinations points is taken. This logic is executed at a batch mode every day.

In yet another aspect, the trip type prediction module 226 is configured to predict the trip type such as whether the trip taken by the driver is a personal trip or a trip to his work place based on the historical and real time geo coordinate data obtained. The Random Forest Regression technique is used to train the model on 80% of the routes that the driver has taken and test it with 20% of the routes. The features used for Random Forest Regression are: i. Time slot of the day the trip starts, ii. weekday/weekend, iii. Starting latitude and longitude of the trip. Trip type prediction module predicts the right destination within a radius of 3 miles.

In yet another aspect, the frequent event location module 228 is configured to compute the points in the trip where a majority of the hard braking, hard speeding events, acceleration and cornering events occurred. The trip is divided into equidistant (for example: if the trip distance is 60 miles, one would divide the trip into 5 bins with each bin having 12 miles each) bins in each bin the frequent events are identified by two flags that is speeding flag and breaking flag, when the event occurs the flag is 'Y' and when it doesn't the flag is 'N'. The count of 'Y's for both the flag leads to identification of the events in a bin. Thus, for each of the bins one would get the number of speeding flags and breaking flags and the count at each of the bins would indicate the frequent bins where the event occurs.

In yet another aspect, the contextual intelligence module 230 is configured to provide contextual intelligence insights to the driver which allow to benefit from knowledge and patterns which driver may not have been aware of for example weather based intelligence, emergency alerts, fuel efficient driving recommendations and so on.

In yet another aspect, the social module 232 is configured to enable drivers to publish their driving scores on various social platforms thereby allowing drivers to engage with their social peers on social media platforms.

In yet another aspect, the gamification module 234 is configured to enable build virtual games with other similar peers on the platform space which allow and motivate the driver towards better driving behavior.

In an embodiment a skilled driver (with scores>threshold score) are ranked into ten deciles based on score values and the decile for each driver is identified.

In each decile an equal number of high scoring drivers will reside. For example, a sample distribution could be as below:

TABLE

Illustrative Decile Score Bands
Scores distribution for skilled drivers

| Decile | Minimum | Maximum |
|---|---|---|
| 1 | 90.0 | 91.9 |
| 2 | 91.9 | 93.3 |
| 3 | 93.3 | 94.1 |
| 4 | 94.1 | 94.8 |
| 5 | 94.8 | 95.7 |
| 6 | 95.7 | 96.1 |
| 7 | 96.1 | 97.0 |
| 8 | 97.0 | 97.6 |
| 9 | 97.6 | 98.3 |
| 10 | 98.3 | 99.8 |

Then the driver discounts could be calculated on a linear scale.

TABLE 5

Dollar Discounts Bands for High Scoring Drivers
Discount Percentages

| Decile | Discount percentages |
|---|---|
| 1 | M-9X |
| 2 | M-8X |
| 3 | M-7X |
| 4 | M-6X |
| 5 | M-5X |
| 6 | M-4X |
| 7 | M-3X |
| 8 | M-2X |
| 9 | M-X |
| 10 | M |

Note:
M = maximum discount Percentage and X = the differential discount percentage Maximum discount for a policy could be fixed at a certain percentage of the policy premium value.

For example, if profit margins permit then the maximum discount percentage is set at 10% for the drivers in the $10^{th}$ decile. The constraint is the minimum discount percentage value for the $1^{st}$ decile needs to be greater than 0%. Hence, one of the ways to spread out the discount percentage across the deciles will be to consider X=1%. In this way, the drivers in the $1^{st}$ decile may obtain 10%-9%=1% discount on their premiums.

The total cost of the discount program for the drivers in the $10^{th}$ decile will be equal to sum of cost of program for each decile.

Cost of discounts in $10^{th}$ decile=$M$ %*Policy Value*Number of drivers in the decile Cost of discounts in the $9^{th}$ decile=($M$ %−$X$ %)*Policy Value*Number of drivers in the decile The above formula used to calculate 10th and 9th decile is accordingly used to calculate the cost of discounts till the $1^{st}$ decile.

In case the total cost of the discount program exceeds an enterprise budgets forecast then two scenarios are made possible:
  i. Reduction of the number of drivers who needs to be given a discount by increasing the threshold score from 90 as depicted in the above example to say 93. This way fewer drivers get selected in the top tier eligible for discounts.
  ii. Reduction in the maximum discount percentage.

Figure 6:
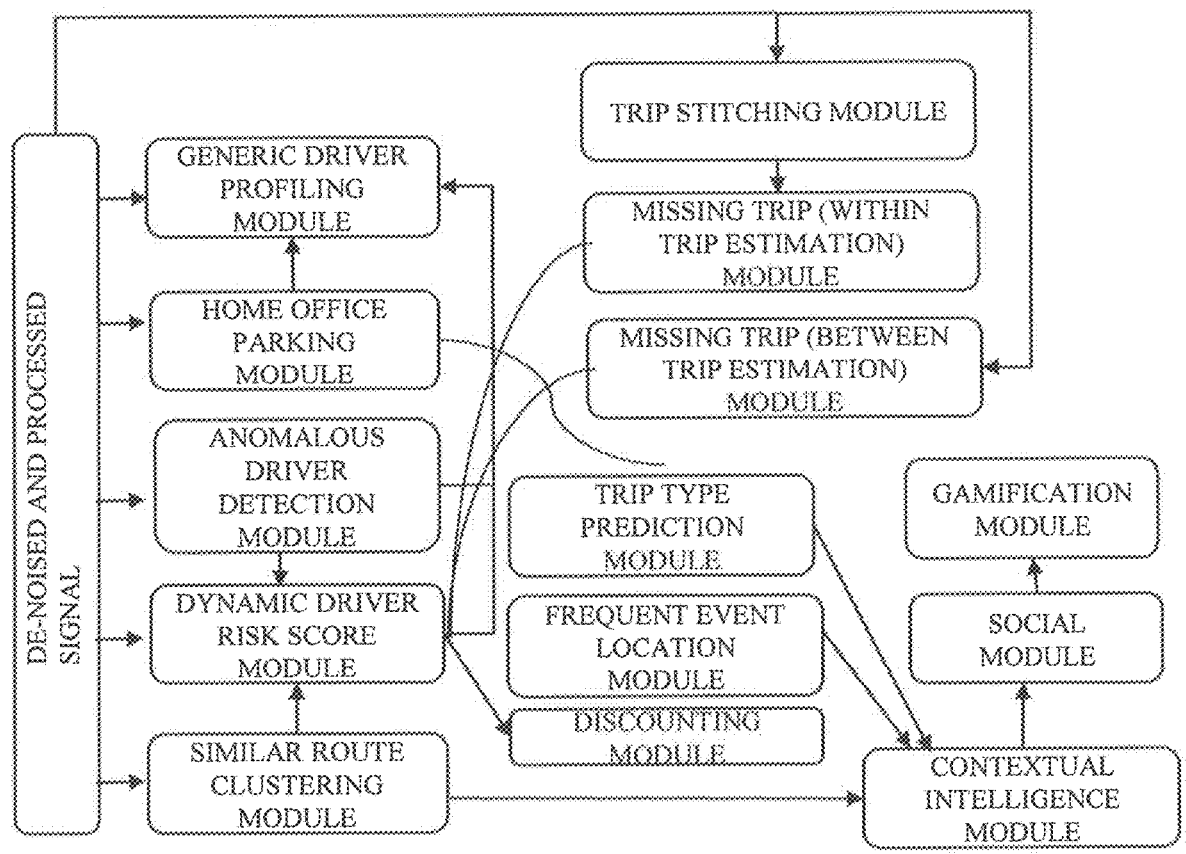
FIG. 6 is an exemplary block diagram illustrating the way various modules as given in FIG. 2 interact with each other, according to some embodiments of the present disclosure.

FIG. 6 illustrates a block diagram showing an exemplary interaction of various modules, according to some embodiments of the present disclosure. The de-noised and processed signal from the geo location sensors is used by the modules to generate the desired outputs.
  i. The dynamic driver risk score module 218 generates the risk score, the anomalous driver detection module 216 generates the probabilities of user not driving. These scores and probabilities are fed to the generic driver profiling module 210 to build driver profiles.
  ii. The similar route clustering module 214 outputs the distance metrics that are used by the generic driver profiling module 210 to generate the driver's overall profile. The distance metrics generated by similar route clustering module 214 is used by the contextual intelligence module 230 to build intelligent contexts for each trip in real time.
  iii. The home office parking module 212 generates home and office parking location estimate which is used by the generic driver profiling module 230 to build driver profile. Home and office parking location estimate generated by the home office parking module 212 is also used by the trip type prediction module 226 to predict which type of trip is the one being driven in real time by the driver.
  iv. The dynamic driver risk score module 218 uses the output from trip stitching module 220 and missing trip modules 222 and 224 for the accurate estimation of the risk scores.
  v. The frequent event location module 228 also acts as input means to the contextual intelligence module 230. This is because the frequent event location module 228 builds bins of the trip with each bin having measures of frequency of certain adverse events. Hence at every part of the route taken in the trip, one would be able to know how a typical driver on average fares with respect to adverse events. The frequent event location module 228 can be able to therefore identify risky routes. At this point one can use this information to suggest new routes in the situation if a driver is taking a risky route. Thus the context in this case will be the route the driver is taking and the frequent event location helps in determining risky versus safe routes.
  vi. The contextual intelligence module 230 further feeds into the social module 232 which is responsible for providing the platform with the capability to display analytics results in social media websites for the driver publish achievements in the driving skills.
  vii. The social module 232 is linked to the gamification module 234 where the gamification module 234 takes the inputs from the social module 232 and the contextual intelligence module 230 to design and build social games for the driver. This allows a way for the user to change his performance and driving behavior as well. Initially safe driving challenges are published on the mobile application. If a driver signs up on a safe driving challenge, then the driver has to demonstrate patterns of safe driving behavior to achieve the targets set up in the challenge such as obtaining a trip level score above a certain threshold score. The driver can also compete with his friends on who gets the best driving score. The achievements from this challenge can be shared on the driver's social media homepage. These details can be then viewed by the social network community.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

In an embodiment, a method and a system for analyzing driver behavior based on telematics data is disclosed. Telematics data is utilized to analyze driver behavior, identify a potentially high-risk or unsafe driving behavior, generate driver profile scores, analyze driver performance, various aspects of vehicle performance, such as vehicle travel delays and vehicle speeds. Various embodiments of the present disclosure provides holistic insight about the driver's driving behavior using end to end analytics platform for analytics on telematics data. Various modules embedded as part of an analytics platform interact with each other via various code layers to receive and send key values from and to each module. The interaction between modules helps to improve from the insights generated by a given module. For example, the dynamic driver risk module takes feedback from the missing trip module, route matching module to improve the risk scores and other driver profiling metrics. Drivers can interact with each other through social and gamification module which leads to improvement of driver behavior on the way he drives the vehicle. The entire platform can perform the analytics calculations in near real time by leveraging certain big data technologies. The platform is also scalable and increasing number users can be added to the analytics platform. This scalability feature is an attribute of certain big data technologies.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer-implemented method for analyzing driver behavior by aggregating telematics data, said method comprising:

computing, by one or more hardware processors, a probability of a user driving a vehicle based on driving patterns and generating a risk score to develop at least one driver profile based on the computed probability, wherein a machine learning model is used in computing the risk score based on driving patterns including standard deviation of speed, percentage time on freeways and idle time ratios;

clustering, by the one or more hardware processors, a plurality of routes taken by said user driving said vehicle to generate enhanced driver profile and using the clustered output to develop a plurality of dynamic contexts for each said route and adding a plurality of contextual messages to customize said risk score, wherein the driver profiling is enabled and associated with a plurality of trip level data for the driver, and wherein a machine learning model based on Ramer-Douglas-Peucker (RDP) technique is used for clustering;

predicting, by the one or more hardware processors, the plurality of routes taken by the said user in real time, wherein predicting includes a prediction of a type of trip based on at least one of a historical and a real time geo co-ordinate data, and wherein a Random Forest machine learning model is used for predicting the plurality of routes taken by the said user;

identifying, by the one or more hardware processors, a missing route through imputation of a plurality of missed routes to compute annualized mileage, and imputing a missing distance in an analysis of at least one trip of the driver in the vehicle, wherein the imputation of the plurality of missed routes is performed using a linear interpolation method;

stitching, by the one or more hardware processors, of a plurality of independent trips based on at least one recommendation from an analytics engine, wherein the plurality of independent trips are stitched when they are within a threshold distance or time difference is less than a threshold; and estimating mileage and accurate risk score for a trip based on the imputation of the plurality of missed routes and stitching of the plurality of independent trips.

2. The computer-implemented method of claim 1, wherein a feedback loop is implemented to receive a plurality of interactions from a computing device.

3. The computer-implemented method of claim 1, further comprising implementation of a route matching and a trip clustering application.

4. The computer-implemented method of claim 1, further comprising a plurality of interconnected modules facilitating a set of user experiences to at least one end user.

5. The computer-implemented method of claim 1, further comprising publishing and storing a plurality of scores on at least one social platform of the driver.

6. The computer-implemented method of claim 1, further comprising building a plurality of driver segmentations based on at least one feature of the driver and identifying a plurality of location of events including hard braking, speeding, hard cornering during a driving trip taken by the driver, wherein identifying includes identifying the plurality of home and office parking location coordinates using historical GPS data collected from a driving pattern of the driver.

7. The computer-implemented method of claim 1, further comprising estimation of a plurality of anomalous driver detection probabilities.

8. A computer-implemented system for analyzing driver behavior by aggregating telematics data, said system comprising:
at least one memory; and
at least one processor, the at least one memory coupled to the at least one processor wherein the at least one processor is capable of executing programmed instructions stored in the at least one memory to:
compute a probability of a user driving a vehicle based on driving patterns and generate a risk score to develop at least one driver profile based on the computed probability, wherein a machine learning model is used to compute the risk score based on driving patterns including standard deviation of speed, percentage time on freeways and idle time ratios;
cluster a plurality of routes taken by said user driving said vehicle to generate enhanced driver profile and use the clustered output to develop a plurality of dynamic contexts for each said route and add a plurality of contextual messages to customize said risk score, wherein the driver profiling is enabled and associated with a plurality of trip level data for the driver, and wherein a machine learning model based on Ramer-Douglas-Peucker (RDP) technique is used to cluster the plurality of routes taken by said user driving said vehicle;
predict the plurality of routes taken by the said user in real time, wherein predicting includes a prediction of a type of trip based on at least one of a historical and a real time geo co-ordinate data, and wherein a Random Forest machine learning model is used to predict the plurality of routes taken by the said user;
identify a missing route through imputation of a plurality of missed routes to compute annualized mileage, and impute a missing distance in an analysis of at least one trip of the driver in the vehicle, wherein the imputation of the plurality of missed routes is performed using a linear interpolation method;
stitch a plurality of independent trips based on at least one recommendation from an analytics engine, wherein the plurality of independent trips are stitched when they are within a threshold distance or time difference is less than a threshold; and
estimate mileage and accurate risk score for a trip based on the imputation of the plurality of missed routes and stitched plurality of independent trips.

9. The computer-implemented system of claim 8, wherein the at least one processor is configured to execute instructions to implement a feedback loop to receive a plurality of interactions from a computing device.

10. The computer-implemented system of claim 8, wherein at least one processor is further configured to execute instructions to implement a route matching and a trip clustering application.

11. The computer-implemented system of claim 8, wherein at least one processor is further configured to execute instructions to a plurality of interconnected modules to facilitate a set of user experiences to at least one end user.

12. The computer-implemented system of claim 8, wherein at least one processor is further capable of executing instructions to publish and store a plurality of scores on at least one social platform of the driver.

13. The computer-implemented system of claim 8, wherein at least one processor is further capable of executing instructions to build a plurality of driver segmentations based on at least one feature of the driver and identify a plurality of location of events including hard braking, speeding, hard cornering during a driving trip taken by the driver, wherein identifying includes identifying the plurality of home and office parking location coordinates using historical GPS data collected from a driving pattern of the driver.

14. The computer-implemented system of claim 8, wherein at least one processor is further capable of executing instructions to estimate a plurality of anomalous driver detection probabilities.

15. A non-transitory computer readable medium embodying a program executable in a computing device, said program comprising:
a program code for computing a probability of a user driving a vehicle based on driving patterns and generating a risk score to develop at least one driver profile based on the computed probability, wherein a machine learning model is used in computing the risk score based on driving patterns including standard deviation of speed, percentage time on freeways and idle time ratios;
a program code for clustering a plurality of routes taken by said user driving said vehicle to generate enhanced driver profile and using the clustered output to develop a plurality of dynamic contexts for each said route and adding a plurality of contextual messages to customize said risk score, wherein the driver profiling is enabled and associated with a plurality of trip level data for the driver, and wherein a machine learning model based on Ramer-Douglas-Peucker (RDP) technique is used for clustering;
a program code for predicting the plurality of routes taken by the said user in real time, wherein predicting includes a prediction of a type of trip based on at least one of a historical and a real time geo co-ordinate data, and wherein a Random Forest machine learning model is used for predicting the plurality of routes taken by the said user;
a program code for identifying a missing route through imputation of a plurality of missed routes to compute annualized mileage, and imputing a missing distance in an analysis of at least one trip of the driver in the vehicle, wherein the imputation of the plurality of missed routes is performed using a linear interpolation method;
a program code for stitching of a plurality of independent trips based on at least one recommendation from an analytics engine, wherein the plurality of independent trips are stitched when they are within a threshold distance or time difference is less than a threshold; and estimating mileage and accurate risk score for a trip based on the imputation of the plurality of missed routes and stitching of the plurality of independent trips.

* * * * *